United States Patent
Kim et al.

(10) Patent No.: US 10,913,353 B2
(45) Date of Patent: Feb. 9, 2021

(54) OPERATION CONTROL METHOD FOR VEHICLE INFOTAINMENT SYSTEM

(71) Applicant: GM GLOBAL TECHNOLOGY OPERATIONS LLC, Detroit, MI (US)

(72) Inventors: Jin Kim, Seoul (KR); Heewon Lee, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/084,381

(22) PCT Filed: Mar. 28, 2017

(86) PCT No.: PCT/KR2017/003297
§ 371 (c)(1),
(2) Date: Sep. 12, 2018

(87) PCT Pub. No.: WO2017/171340
PCT Pub. Date: Oct. 5, 2017

(65) Prior Publication Data
US 2019/0084420 A1 Mar. 21, 2019

(30) Foreign Application Priority Data
Mar. 30, 2016 (KR) .................. 10-2016-0038531

(51) Int. Cl.
*B60K 35/00* (2006.01)
*H04L 29/08* (2006.01)
(Continued)

(52) U.S. Cl.
CPC .............. *B60K 35/00* (2013.01); *B60R 16/02* (2013.01); *G06F 3/1454* (2013.01); *H02J 7/00* (2013.01);
(Continued)

(58) Field of Classification Search
CPC .............. B60K 35/00; B60K 2370/184; B60K 2370/589; B60K 2370/52; B60R 16/02;
(Continued)

(56) References Cited

U.S. PATENT DOCUMENTS 7,891,011 B1 * 2/2011 Thenthiruperai ....... G06F 21/10
726/30
8,669,735 B2 3/2014 Kim et al.
(Continued)

FOREIGN PATENT DOCUMENTS

JP 2015051762 A 3/2015
KR 1020100043531 A 4/2010
(Continued)

OTHER PUBLICATIONS

Extended European Search Report for Application No. 17775764.8 dated Nov. 25, 2019 (7 pages).

*Primary Examiner* — Angelina Shudy
(74) *Attorney, Agent, or Firm* — Reising Ethington, P.C.

(57) ABSTRACT

An operation control method for a vehicle infotainment system for enabling phone projection to be automatically executed during a connection between a head unit of a vehicle and a smart device, and the method comprises: a phone projection setting step of allowing any one of a plurality of phone projections mounted on a head unit of a vehicle to be set; a step of connecting a first smart device to the head unit of a vehicle; a step of determining whether the first smart device connected to the head unit of a vehicle supports the phone projection set in the phone projection setting step; and a step of executing the set phone projection if the first smart device supports the set phone projection, according to the determination result.

4 Claims, 2 Drawing Sheets

(51) Int. Cl.
*H02J 7/00* (2006.01)
*B60R 16/02* (2006.01)
*G06F 3/14* (2006.01)

(52) U.S. Cl.
CPC ........ *H04L 29/08* (2013.01); *B60K 2370/184* (2019.05); *B60K 2370/52* (2019.05); *B60K 2370/589* (2019.05); *G09G 2370/16* (2013.01)

(58) Field of Classification Search
CPC .......... G06F 3/1454; H02J 7/00; H04L 29/08; G09G 2370/16
See application file for complete search history.

(56) References Cited

U.S. PATENT DOCUMENTS

| | | | | |
|---|---|---|---|---|
| 8,676,270 | B2* | 3/2014 | Ukai | H04M 1/7253 |
| | | | | 455/566 |
| 8,811,966 | B2* | 8/2014 | Sakata | H04W 4/40 |
| | | | | 455/418 |
| 9,026,049 | B2* | 5/2015 | Kim | H04L 65/60 |
| | | | | 455/41.1 |
| 9,116,563 | B2* | 8/2015 | Kurosawa | G06F 3/041 |
| 9,302,676 | B2 | 4/2016 | Nagara et al. | |
| 9,933,988 | B2* | 4/2018 | Noh | G06F 1/1643 |
| 10,064,081 | B2* | 8/2018 | Lee | H04W 4/80 |
| 2003/0156097 | A1* | 8/2003 | Kakihara | G01C 21/3688 |
| | | | | 345/156 |
| 2005/0182535 | A1* | 8/2005 | Huang | H04L 43/50 |
| | | | | 701/31.4 |
| 2008/0032721 | A1* | 2/2008 | MacDonald | H04L 51/14 |
| | | | | 455/466 |
| 2010/0097030 | A1* | 4/2010 | Kim | G06F 1/1601 |
| | | | | 320/106 |
| 2011/0086678 | A1* | 4/2011 | Suzuki | H04M 1/6091 |
| | | | | 455/569.2 |
| 2011/0093153 | A1* | 4/2011 | Moinzadeh | H04M 1/72577 |
| | | | | 701/31.4 |
| 2011/0153427 | A1* | 6/2011 | Crolley | G06Q 30/0261 |
| | | | | 705/14.58 |
| 2011/0167182 | A1* | 7/2011 | Palin | H04L 69/18 |
| | | | | 710/105 |
| 2012/0050183 | A1* | 3/2012 | Lee | G06F 3/1423 |
| | | | | 345/173 |
| 2013/0005319 | A1* | 1/2013 | Sakata | B60R 25/00 |
| | | | | 455/418 |
| 2014/0309868 | A1* | 10/2014 | Ricci | B60R 25/1004 |
| | | | | 701/36 |
| 2015/0015479 | A1* | 1/2015 | Cho | G06F 3/1423 |
| | | | | 345/156 |
| 2015/0073651 | A1* | 3/2015 | Nagara | B60W 50/08 |
| | | | | 701/36 |
| 2015/0193093 | A1* | 7/2015 | Grover | G06F 3/0482 |
| | | | | 715/739 |
| 2015/0234575 | A1* | 8/2015 | Suk | G06F 3/04817 |
| | | | | 715/740 |
| 2017/0214781 | A1* | 7/2017 | Ichida | H04M 1/72569 |
| 2017/0247000 | A1* | 8/2017 | Ricci | B60R 16/037 |
| 2017/0257479 | A1* | 9/2017 | Marcum | H04M 1/0266 |
| 2017/0359423 | A1* | 12/2017 | Nadathur | H04L 65/4069 |
| 2018/0356217 | A1* | 12/2018 | Jensen | G01C 23/005 |
| 2019/0248378 | A1* | 8/2019 | Nix | G05D 1/0077 |
| 2019/0294895 | A1* | 9/2019 | Kleen | G06K 9/00805 |
| 2020/0101844 | A1* | 4/2020 | Miller, Jr. | H04W 4/40 |

FOREIGN PATENT DOCUMENTS

| | | |
|---|---|---|
| KR | 1020120039894 A | 4/2012 |
| KR | 1020130070336 A | 6/2013 |
| KR | 101510041 B1 | 4/2015 |
| KR | 101570603 B1 | 11/2015 |

* cited by examiner

OPERATION CONTROL METHOD FOR VEHICLE INFOTAINMENT SYSTEM

INTRODUCTION

The present disclosure relates to an operation control method for a vehicle infotainment system, and more particularly, to an operation control method for a vehicle infotainment system for enabling phone projection to be automatically executed during a connection between a head unit of a vehicle and a smart device.

In-Vehicle Infotainment System is a combination of automobiles with IT technology, and is a system that implements information and entertainment functionality in automobiles.

Meanwhile, recently, with the widespread use of smart devices such as smartphones and tablet PCs and development of information technology (IT), the types of smart devices that can be wiredly or wirelessly connected to vehicle head units are being extended.

As described above, as the types of smart devices that can be connected to vehicle head units are extended, it is possible to connect to phone projection, for example, Google's Android Auto, Apple's CarPlay and Nokia's Mirrorlink, as well as universal function, MP3 player (e.g., iPod), MTG (USB Storage) Media Transfer Protocol (MTP).

To use smart devices as connected to vehicle head units that support phone projection such as Google's Android Auto, Apple's CarPlay and Nokia's Mirrorlink by a wired or wireless method, conventionally, users could use them after setting up (e.g., select Android Auto icon, select Mirrorlink connection, etc.) via an input device provided in the vehicle head unit or an input device provided in the smart device and executing phone projection. Accordingly, there is inconvenience caused by the need for this setup each time the smart device is connected to the vehicle head unit.

SUMMARY

In an embodiment, the present disclosure is designed to solve the above-described problem, and therefore the present disclosure is directed to providing an operation control method for a vehicle infotainment system for enabling phone projection to be automatically executed during a connection between a head unit of a vehicle and a smart device.

To achieve the above-described object, an operation control method for a vehicle infotainment system according to an embodiment of the present disclosure preferably includes a phone projection setting step of allowing any one of a plurality of phone projections mounted on a head unit of a vehicle to be set, a step of connecting a first smart device to the head unit of a vehicle, a step of determining whether the first smart device connected to the head unit of a vehicle supports the phone projection set in the phone projection setting step, and a step of executing the set phone projection if the first smart device supports the set phone projection, according to the determination result.

According to the operation control method for a vehicle infotainment system of the present disclosure, phone projection is automatically executed during a connection between a head unit of a vehicle and a smart device, and therefore, since a user does not have to carry out a separate setting when the head unit of a vehicle is connected to the smart device, convenience of use can be provided.

DETAILED DESCRIPTION

Hereinafter, an operation control method for a vehicle infotainment system according to an embodiment of the present disclosure will be described in detail with reference to the accompanying drawings.

Figure 1:
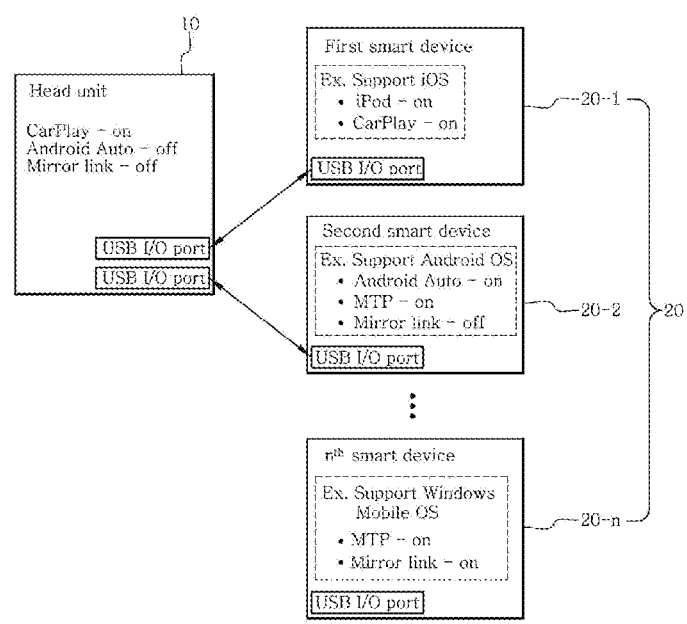
FIG. 1 is a diagram schematically showing the architecture of a vehicle infotainment system according to an embodiment of the present disclosure.

FIG. 1 is a diagram schematically showing the architecture of the vehicle infotainment system according to an embodiment of the present disclosure.

In FIG. 1, a vehicle head unit 10 may be connected to at least one smart device 20:20-1, 20-2, . . . , 20-$n$ wiredly or wirelessly, and has at least one phone projection mounted thereon to share the same screen configuration and application function with the wiredly or wirelessly connected smart device 20:20-1, 20-2, . . . , 20-$n$.

Here, the phone projection that may be mounted on the vehicle head unit 10 may be Android Auto that supports Android OS, CarPlay that supports Ios, and Mirrorlink that supports Windows Mobile OS, and the like.

The vehicle head unit 10 may be implemented as an Audio/Video (AV) system and AVN (Audio/Video Navigation) installed in the vehicle.

The smart device 20:20-1, 20-2, . . . , 20-$n$ is connected to the vehicle head unit 10 wiredly or wirelessly to construct a vehicle infotainment system.

The smart device 20:20-1, 20-2, . . . , 20-$n$ may be implemented as a smartphone, a tablet PC, an MP3 player, a USB memory, and the like.

The vehicle head unit 10 and the smart device 20:20-1, 20-2, . . . , 20-$n$ may be wiredly connected via USB communication devices, and may be wirelessly connected according to the near field communication technology (e.g., Wireless LAN, WiFi, Bluetooth, Zigbee, Near Field Communication (NFC), and the like).

Table 1 shows the execution priority for each smart device, and the phone projection function has the highest priority and the media function has the second highest priority. Accordingly, when the smart device 20 is connected to the vehicle head unit 10, phone projection may be executed with highest priority, and the media function may be executed next.

TABLE 1

|  | 1$^{st}$ | 2$^{nd}$ | 3$^{rd}$ | . . . | Nth |
|---|---|---|---|---|---|
| Smartphone that supports Android OS | Phone projection | Media (can be switched) | Media (can be switched) | . . . | Media (can be switched) |
| MP3 player | Media | Media | Media | . . . | Media |
| Smartphone that supports IOS | Phone projection | Media (can be switched) | Media (can be switched) | . . . | Media (can be switched) |
| Smartphone that supports Windows Mobile OS | Phone projection | Media (can be switched) | Media (can be switched) | . . . | Media (can be switched) |

Figure 2:
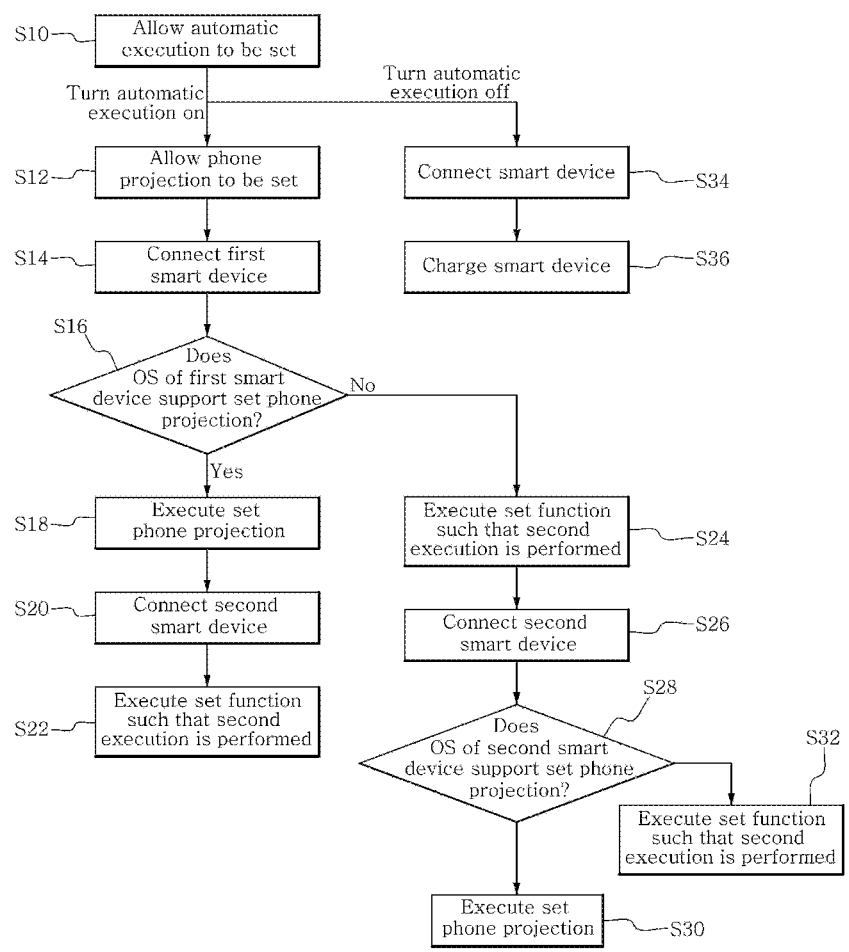
FIG. 2 is a flowchart illustrating an operation control method for a vehicle infotainment system according to an embodiment of the present disclosure.

FIG. 2 is a flowchart illustrating an operation control method for a vehicle infotainment system according to an embodiment of the present disclosure.

First, the vehicle head unit 10 allows automatic execution of phone projection and media to be set upon connection between the vehicle head unit 10 and the smart device 20 via the input device (S10).

When phone projection and media are set to be automatically executed (automatic execution ON) in S10, the vehicle head unit 10 allows the user to set any one (e.g., CarPlay) of a plurality of phone projections mounted in the memory unit (not shown) (S12). Here, the step of allowing automatic execution to be set (S10) and the step of allowing phone projection to be set (S12) may vary in order, and the step of allowing automatic execution to be set (S10) and the step of allowing phone projection to be set (S12) may be performed freely by the user at any time.

Subsequently, when the first smart device 20-1 (e.g., smartphone that supports Ios) is connected to the vehicle head unit 10 wiredly or wirelessly (S14), the vehicle head unit 10 determines whether the OS of the first smart device 20-1 connected in S14 supports the phone projection (e.g., CarPlay) set in S10 (S16).

If the OS of the first smart device 20-1 supports the phone projection (e.g., CarPlay) set in S12 (S16: Yes) according to the determination result of S16, the phone projection (e.g., CarPlay) set in S12 is automatically executed to display the home screen of the phone projection (e.g., CarPlay) on the monitor (not shown) of the vehicle (S18).

The first smart device 20-1 (e.g., smartphone that supports Ios) connected to the vehicle head unit 10 in S14 is connected to the phone projection (e.g., CarPlay) executed in S18.

Subsequently, when the second smart device 20-2 (e.g., smartphone that supports Android OS) is connected to the vehicle head unit 10 wiredly or wirelessly (S20), the vehicle head unit 10 executes the set function (e.g., media) such that second execution is performed corresponding to the second smart device 20-2 (S22).

Meanwhile, if the OS of the first smart device 20-1 (e.g., smartphone that supports Android OS) wiredly or wirelessly connected to the vehicle head unit 10 in S14 does not support the phone projection (e.g., CarPlay) set in S10 (S16: No), the vehicle head unit 10 executes the set function (e.g., media) such that second execution is performed corresponding to the first smart device 20-1 (e.g., smartphone that supports Android OS) (S24).

Here, in case that the first smart device 20-1 wiredly or wirelessly connected to the vehicle head unit 10 in S14 is a smartphone that supports, for example, Android OS, even though Android Auto is set to be executed on the first smart device 20-1, Android Auto may not be set on the vehicle head unit 10 (e.g., CarPlay is set on the vehicle head unit 10). In this case, the vehicle head unit 10 does not execute Android Auto, and executes the set function (e.g., media) such that second execution is performed corresponding to the first smart device 20-1 (e.g., smartphone that supports Android OS).

Additionally, if the OS of the first smart device 20-1 (e.g., smartphone that supports Android OS) does not support the phone projection (e.g., CarPlay) set in S12, the user may automatically execute phone projection (e.g., Android Auto) via the vehicle head unit 10 like changing the setting of phone projection, for example, from CarPlay to Android Auto. Accordingly, the home screen of phone projection (e.g., Android Auto) may be displayed on the monitor (not shown) of the vehicle.

Meanwhile, after the first smart device 20-1, for example, a smartphone that supports Android OS is connected to the vehicle head unit 10 in S14, when the second smart device 20-2 (e.g., smartphone that supports Ios) is connected to the vehicle head unit 10 wiredly or wirelessly (S26), the vehicle head unit 10 determines whether the OS of the second smart device 20-2 connected in S26 supports the phone projection (e.g., CarPlay) set in S12 (S28).

If the OS of the second smart device 20-2 supports the phone projection (e.g., CarPlay) set in S12 (S28: Yes) according to the determination result of S28, the phone projection (e.g., CarPlay) set in S12 is automatically executed to display the home screen of the phone projection (e.g., CarPlay) on the monitor (not shown) of the vehicle (S30).

Meanwhile, if the OS of the second smart device 20-2 (e.g., smartphone that supports Windows Mobile OS) connected to the vehicle head unit 10 wiredly or wirelessly in S26 does not support the phone projection (e.g., CarPlay) set in S12 (S26: No), the vehicle head unit 10 executes the set function (e.g., media) such that second execution is performed corresponding to the second smart device 20-2 (e.g., smartphone that supports Windows Mobile OS) (S32).

Meanwhile, in S10, phone projection and media may be not set to be automatically executed (automatic execution OFF). In this case, when the smart device 20 is connected to the vehicle head unit 10 wiredly or wirelessly (S34), the vehicle head unit 10 may charge the smart device 20 without executing phone projection and media (S36).

The operation control method for a vehicle infotainment system according to the present disclosure is not limited to the above-described embodiments and may be variously modified within the permitted range by the technical spirit of the present disclosure.

The invention claimed is:

1. An operation control method for a vehicle infotainment system, comprising:
    a phone projection setting step of allowing any one of a plurality of phone projections mounted on a head unit of a vehicle to be set;
    a step of connecting a first smart device to the head unit of a vehicle;
    a step of determining whether the first smart device connected to the head unit of a vehicle supports the phone projection set in the phone projection setting step;
    a step of executing the set phone projection if the first smart device supports the set phone projection, according to the determination result, the set phone projection being executed with a first priority if the first smart device supports the set phone projection; and
    a step of executing a set function corresponding to the first smart device when the first smart device does not support the set phone projection, wherein the set function is executed with a second priority if the first smart device supports the set phone projection.

2. The operation control method for a vehicle infotainment system according to claim 1, further comprising:
    a step of connecting a second smart device to the head unit of a vehicle;
    a step of determining whether the second smart device connected to the head unit of a vehicle supports the set phone projection; and
    a step of executing the set phone projection if the second smart device supports the set phone projection, according to the determination result.

3. The operation control method for a vehicle infotainment system according to claim 1, further comprising:
    a step of connecting a second smart device to the head unit of a vehicle; and
    a step of executing a set function such that second execution is performed corresponding to the second smart device.

4. The operation control method for a vehicle infotainment system according to claim 1, further comprising:
  before performing the step of setting the phone projection,
    a step of setting to allow automatic execution of phone projection upon connection between the head unit of a vehicle and the smart device; and
  a step of charging a connected smart device when the smart device is connected to the head unit of a vehicle if the phone projection is not set to be automatically executed in the automatic execution setting step.

\* \* \* \* \*